July 1, 1941.  G. GERALDSON  2,248,022
MOWER
Filed June 5, 1939  3 Sheets-Sheet 1

INVENTOR.
Gerald Geraldson
BY Emerson B Donnell
ATTORNEY

July 1, 1941.  G. GERALDSON  2,248,022
MOWER
Filed June 5, 1939  3 Sheets-Sheet 3

INVENTOR.
Gerald Geraldson
BY Emerson B Donnell
ATTORNEY

Patented July 1, 1941

2,248,022

UNITED STATES PATENT OFFICE 2,248,022

MOWER

Gerald Geraldson, Rockford, Ill., assignor to J. I. Case Company, Racine, Wis., a corporation Application June 5, 1939, Serial No. 277,386

6 Claims. (Cl. 56—25)

The present invention relates to mowing machines and an object thereof is to generally improve the construction and operation of devices of this class.

More particularly an object of the invention is to improve the construction and operation of mowers of the type that are carried directly on a tractor and operated by the power take-off thereof.

A further object is to provide an improved belt drive from the power take-off to the mower mechanism, and further objects are to provide an improved crank shaft mounting; such a mounting including an adjustable bearing which may be shifted to obtain the necessary belt tension without affecting the action of other parts of the mower; improved means for so shifting the bearing; improved means for clamping the bearing in adjusted position, and expedients for the realization of the above objects.

The features of construction utilized for the accomplishment of the above are shown in the accompanying drawings in which Figure 1 is a perspective view of the rear of a tractor with the improved mower construction attached.

Figure 1:
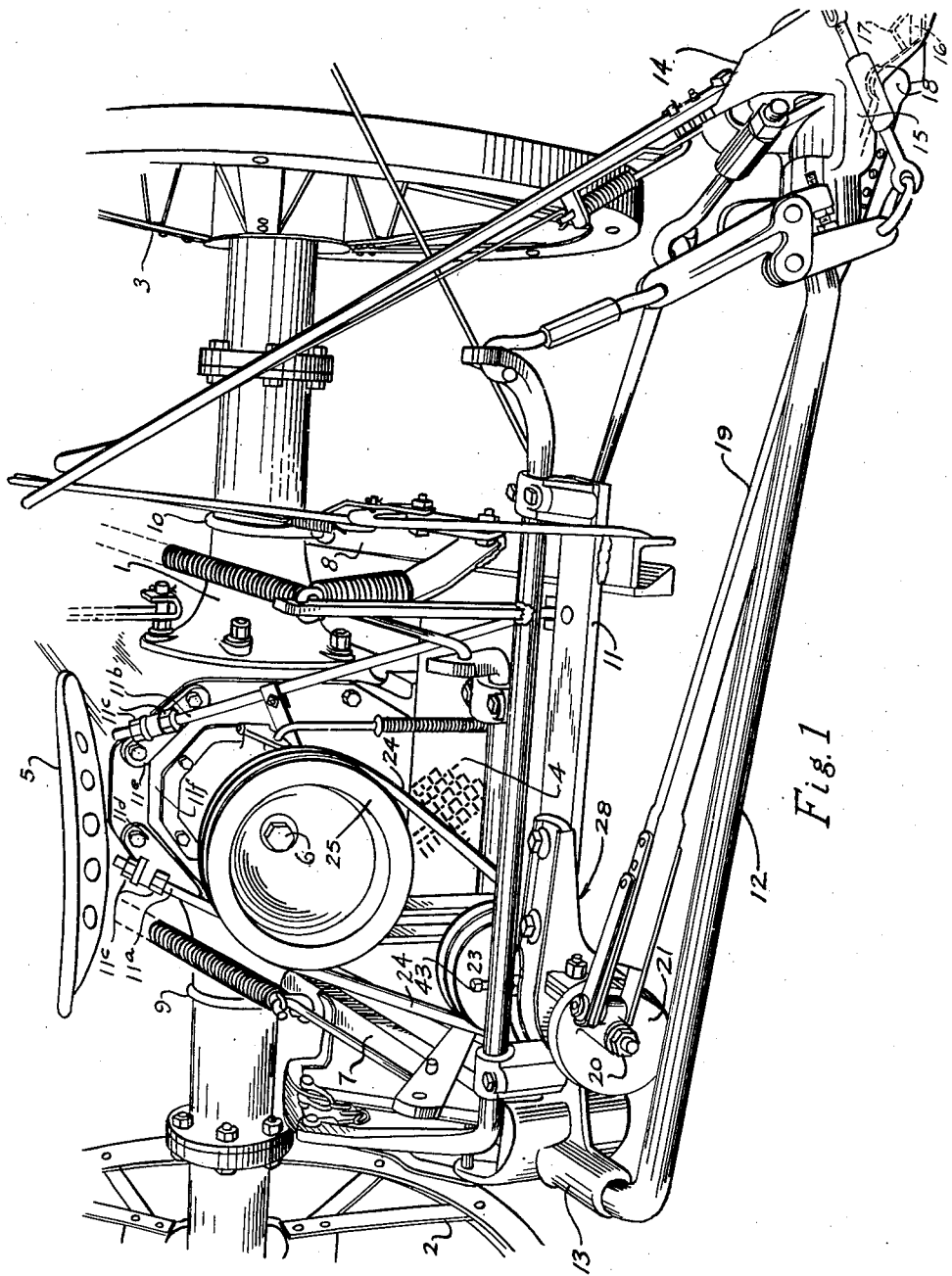

As seen in Fig. 1, the mower is mounted on a tractor having a rear axle construction generally designated as 1, traction wheels 2 and 3, a platform 4, a seat 5, and a power take-off shaft 6, other details of the tractor being shown but having no bearing on the attachment or operation of the mower.

The mower construction itself includes two frame members 7 and 8 clamped by U bolts or the equivalent 9 and 10, to the tractor axle, members 7 and 8 being connected at the rear of the tractor by means of a transverse frame element 11 supported from braces 11ª and 11ᵇ fixed to the element 11 and adjustable for a purpose to appear as by nuts 11ᶜ—11ᶜ engaging brackets 11ᵈ and 11ᵉ fixed with the central housing portion 11ᶠ of the axle structure of the tractor. A push bar 12 is suitably pivoted as by bearing 13 to frame element 11 and extends across the back of the tractor into engagement with a yoke 14 which carries and propels a shoe 15 in suitable or well-known manner. A cutter bar 16 extends outwardly from the shoe and carries a sickle 17 for reciprocating movement in the usual manner, the sickle carrying a bearing 18 of any suitable type for engagement with a pitman.

A pitman 19, is pivoted to the bearing 18 and extends generally in the direction of push bar 12 to engage a crank pin 20 on a crank disk 21 fixed on a crank shaft 22 (Fig. 2), rotation of the crank shaft causing reciprocation of sickle 17 through the connection of pitman 19 in the usual manner. Crank shaft 22 is carried in a bearing to be later described and has a pulley 23 disposed forwardly of above-mentioned element 11 and carrying one or more belts 24 of any suitable or well-known type engaging another pulley or sheave 25 fixed on power take-off shaft 6. Rotation of shaft 6 will accordingly cause rotation of crank shaft 22 and actuation of the mechanism as will be understood.

As will be understood from the construction so far described, mower frame 7, 8, 11 etc., may be applied to the tractor and braces 11ª and 11ᵇ adjusted by means of nuts 11ᶜ—11ᶜ until crankshaft 22 is substantially parallel with power take-off shaft 6, the parts being so proportioned that pulley 23 is then properly aligned with pulley 25. This adjustment is made when the mower is first applied to the tractor and is not disturbed thereafter.

Other details of the mowing mechanism are shown sufficient to denote an operative machine but form no part of the present invention.

Figure 2:
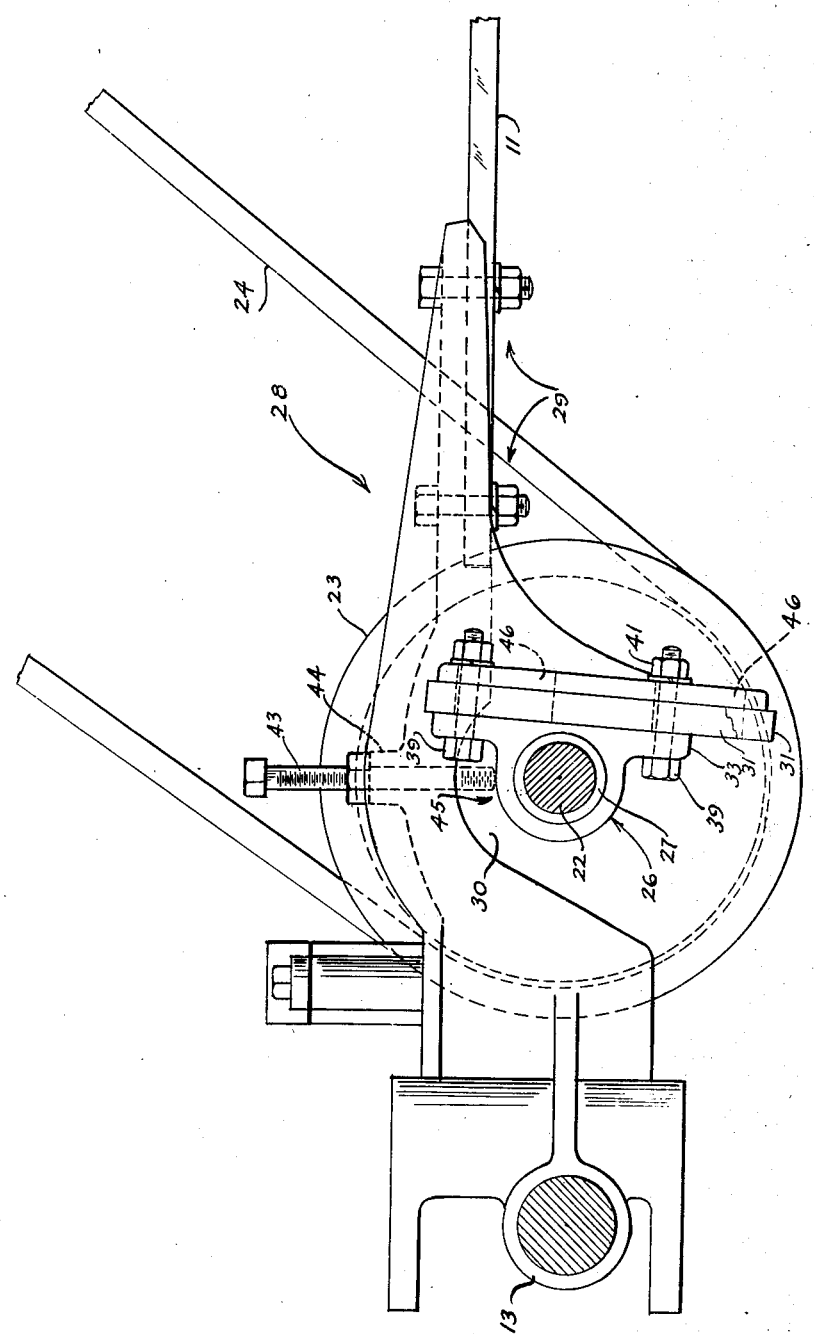
Fig. 2 is a rear elevation of a portion of the mechanism shown in Fig. 1, with parts removed.
Figure 3:
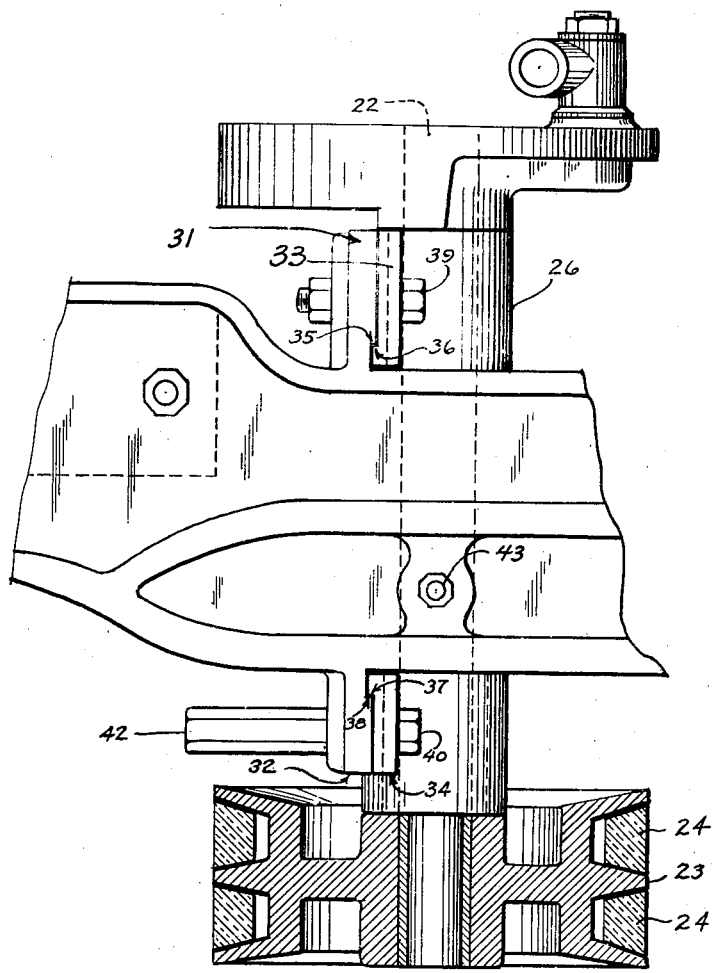
Fig. 3 is a plan view of same with certain parts removed and others in section.

Crank shaft 22 as more particularly shown in Fig. 2 is carried in a bearing generally designated as 26, supported for movement for adjusting the tension of belts 24, and it may be provided, if desired, with a bushing 27 or other suitable journal bearings means, such for example as any of the well-known types of anti-friction bearing expedients within the contemplation of the invention.

For supporting bearing 26 for such movement, above-mentioned frame member 11 has a portion generally designated as 28 formed in the present instance for convenience as a casting, although the invention is not intended to be limited to such formation, or in fact in any manner except as defined in the claims, bolted or otherwise fixed at 29 to member 11. Member 28 has an arched portion at 30, within which bearing 26 is supported, and at the right of the arch, as seen in Fig. 2, are arranged guiding, clamping, or flange portions 31 and 32 against which complementary guiding, clamping, or flanged portions 33 and 34 of bearing 26 are arranged to provide for displacement of the bearing in a substantially vertical direction, while maintaining satisfactorily accurate alignment of belt pulley 23 with belt 24 and pulley 25.

For insuring proper guiding of bearing 26, flanges 31 and 33 may be provided with complementary shoulders 35 and 36, extending in the direction of movement of bearing 26, while flanges 32 and 34 may have similar shoulders 37 and 38 respectively. These together with the meeting faces of the flanges operate to guide the bearing 26 in a predetermined path when adjustment is effected. Other suitable or well-known inter-fitting guiding means are contemplated as equivalent.

Flanges 31—33 and 32—34 may be clamped forcibly together as for example by bolts 39—39 and 40—40, having, respectively, nuts 41—41 and 42—42 forming a convenient means for locking the bearing in desired adjusted position. Other well-known expedients for clamping the flanges together are contemplated as within the scope of the invention.

Bearing 26 is adjusted in position when bolts 39 and 40 are loosened by means of a set screw 43, threadedly or otherwise suitably engaged with a boss 44 on arched portion 30 of member 28, and pressing against a suitable portion of bearing 26 as at 45.

Bolts 39—39 and 40—40 may extend, for example, through slots such as 46—46 in flanges 31 and 32 to provide for vertical movement through a range sufficient to accommodate any changes in length or variation in individual belts 24.

Figure 4:
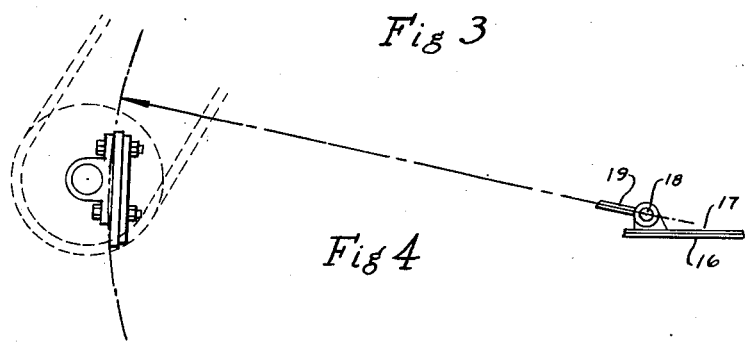
Fig. 4 is a diagrammatic view of certain parts indicated in Fig. 1, showing certain operating relationships.

Flanges 31—33 and 32—34 may extend in a generally vertical direction or within the contemplation of the invention, may extend in a direction substantially tangent to an arc, drawn about sickle bearing 18 as a center, whereby adjustment of bearing 26 will have no effect on the registration of sickle 17 with the usual cooperating parts of the cutter bar. See Fig. 4.

It is contemplated that suitable or well-known guiding means might be substituted for flanges 31—33 etc., and the adjustment of bearing 26 maintained solely by screw 43. On the other hand, it is considered within the invention to omit screw 43 and adjust the position of bearing 26 by any well-known expedient.

Other variations are contemplated, such for example as a single flange or guide with suitable clamping means in place of a plurality of guides 31 and 32. Any such variations are considered within the scope of the present invention, which is not to be considered as limited to the exact structure shown and described except as defined by the pending claims.

The above being a complete description of an illustrative embodiment of the invention what is claimed as new and desired to be secured by Letters Patent of the United States is:

1. In a power mower a lower frame element including an arched member, a flange extending downwardly beneath said arched member at one side thereof, a crank shaft bearing extending through said arch, a crank shaft in said bearing and having a belt pulley on one end, a crank on said shaft and a pitman extending from said crank, a flange on said bearing and engaged with the flange on said arch, said flanges extending in a direction normal to the pitman in its median position, means for clamping said flanges together and means for adjusting said bearing in a belt tightening direction when said flanges are unclamped, the disposition of said flanges providing for such movement while maintaining a satisfactory relation between said crank and pitman.

2. In a mower construction, a frame member, a shaft bearing, a shaft in the bearing, and a pulley on the shaft, guiding means on the frame member and cooperating guiding means on the bearing, a crank on the shaft, a pitman engaged with the crank, a reciprocating sickle, a sickle bearing connecting said pitman and sickle, said guides being so disposed as to provide for movement of said bearing in a direction substantially normal to the pitman in its median position, means for clamping said guiding means together and means for adjusting the said bearing in the said normal direction when said guiding means are unclamped.

3. In a mower construction, a frame member, a shaft bearing, a shaft in the bearing, and a pulley on the shaft, guiding means on the frame member and cooperating guiding means on the bearing, a crank on the shaft, a pitman engaged with the crank, a reciprocating sickle, a sickle bearing connecting said pitman and sickle, said guides being so disposed as to provide for movement of said bearing in a direction substantially normal to the pitman in its median position, and means for adjusting the bearing in said normal direction.

4. In a mower the combination of a tractor having an axle, a mower frame carried on the tractor and vertically swingable about the axle, a pulley on the tractor, a pulley on the frame beneath the first named pulley, a belt connecting the pulleys, means for adjusting the frame in a vertical direction about the axle for aligning the second mentioned pulley with the first, and means separate from said adjusting means for adjusting the second mentioned pulley vertically in a belt tightening direction independently of the adjustment of said frame whereby to preserve the alignment of said pulleys while correcting the tension of said belt.

5. In a mower the combination of a tractor having an axle, a mower frame carried on a tractor and swingable about the axle, a pulley on the tractor, a pulley on the frame, a belt connecting the pulleys, means for adjusting the frame in a vertically swinging direction about the axle for aligning the second mentioned pulley with the first, a cutter bar including a sickle, a sickle bearing on the sickle, a shaft rotatably supported from the frame and on which the second mentioned pulley is fixed, a crank on said shaft, a pitman connecting said sickle bearing with said crank, means separate from said adjusting means, for vertically adjusting said second mentioned pulley, said shaft and said crank in a direction substantially normal to the pitman in its median position, for shifting said second mentioned pulley in a vertical belt tightening direction independently of the adjustment of said frame whereby to preserve the alignment of said pulleys and the registration of said sickle with said cutter bar while correcting the tension of said belt.

6. In a cutter drive construction, the combination of a frame member, a shaft bearing, a shaft in the bearing, and a pulley on the shaft, guiding means for supporting the bearing from the frame member and adapted to provide for adjusting movement of said bearing relatively to said frame member, a crank on the shaft, a pitman engaged with the crank and extending laterally from said guiding means, a reciprocating sickle, a cutter bar adapted to register with said sickle, a sickle bearing connecting said pitman and sickle, said means being adapted to guide said adjusting movement in a direction substantially normal to the pitman in its median position, whereby to provide for correcting the tension of a belt engaged with said pulley while preserving the registration of said sickle with said cutter bar.

GERALD GERALDSON.